March 8, 1966　　　L. P. LEIGH, JR　　　3,238,773
DEFLECTABLE PROBE TYPE TRANSDUCER
Filed March 16, 1962　　　　　　　　　　　　　3 Sheets-Sheet 1
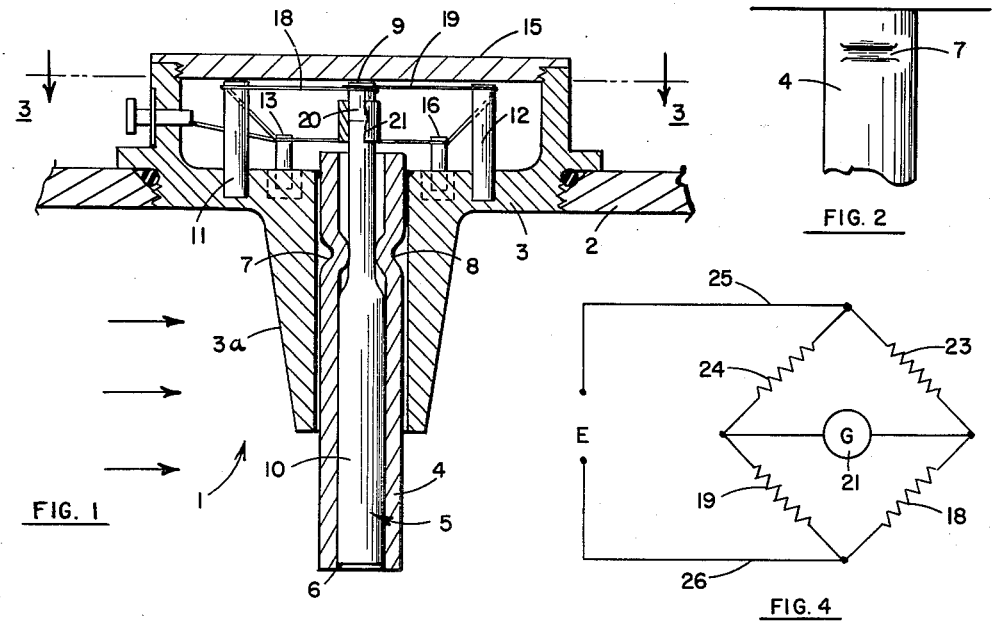
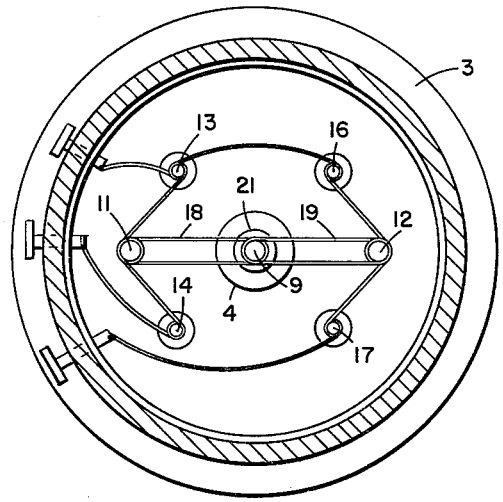
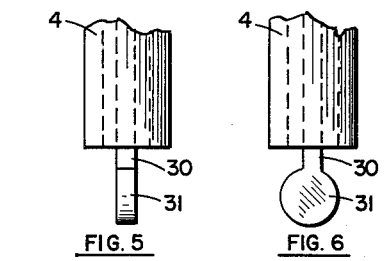
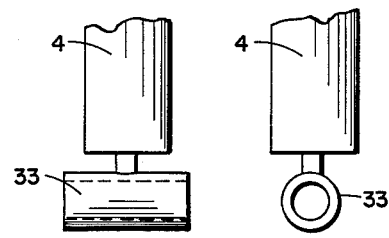
INVENTOR.
LEONARD P. LEIGH, JR.
BY
ATTORNEY

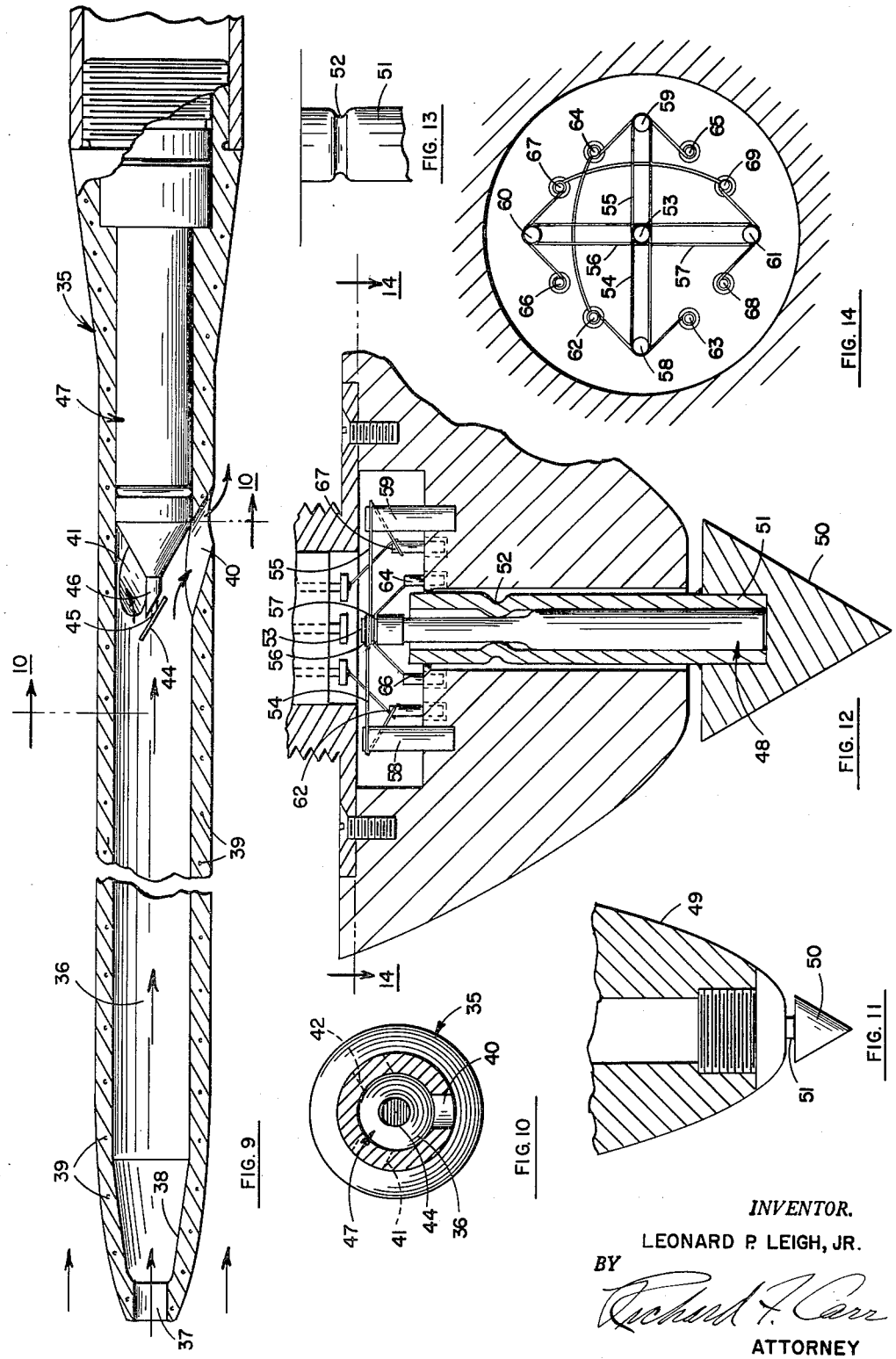

March 8, 1966  L. P. LEIGH, JR  3,238,773
DEFLECTABLE PROBE TYPE TRANSDUCER
Filed March 16, 1962  3 Sheets-Sheet 3
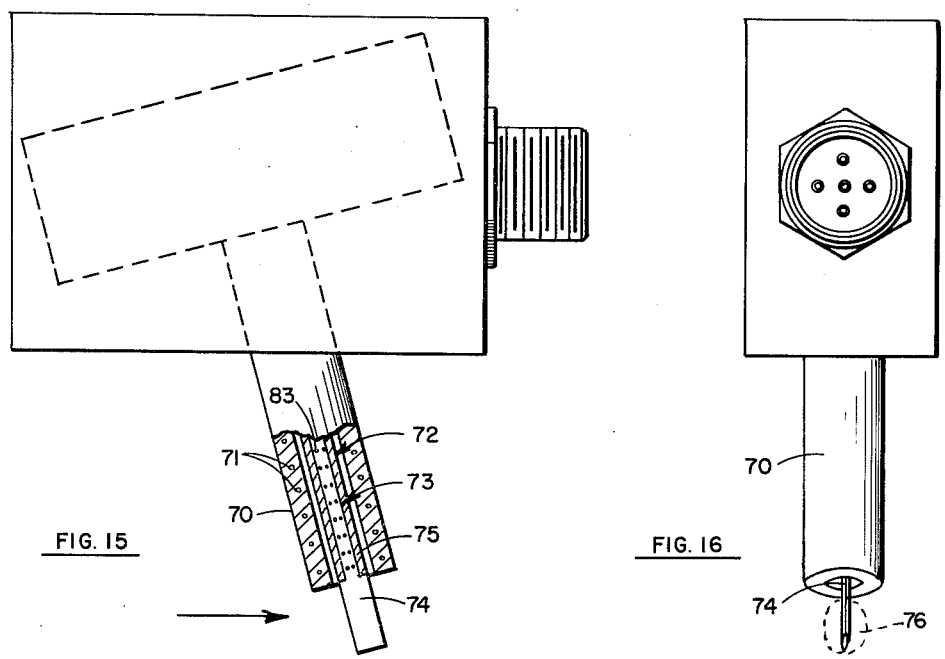
FIG. 15
FIG. 16
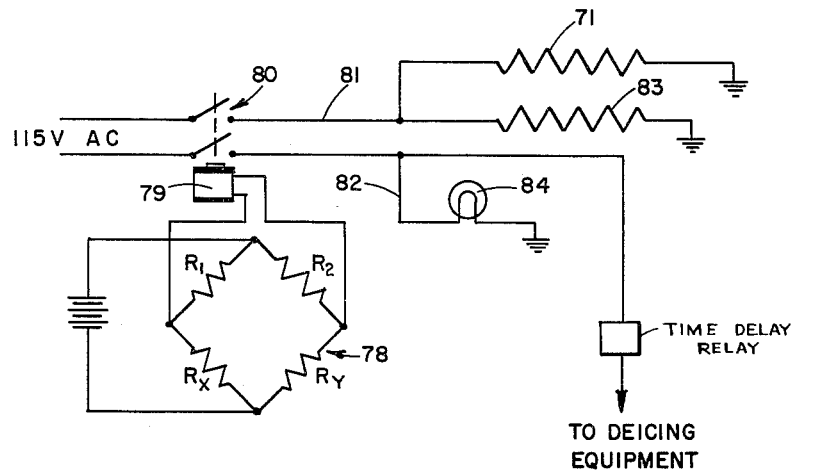
FIG. 17
TO DEICING EQUIPMENT
INVENTOR.
LEONARD P. LEIGH, JR.
BY
ATTORNEY United States Patent Office 3,238,773
Patented Mar. 8, 1966

3,238,773
DEFLECTABLE PROBE TYPE TRANSDUCER
Leonard P. Leigh, Jr., 17050 Tribune St.,
Granada Hills, Calif.
Filed Mar. 16, 1962, Ser. No. 180,250
1 Claim. (Cl. 73—170)

This invention pertains to an instrument having a deflectable probe particularly adapted for use as a flow meter, air speed indicator, angle of attack indicator, ice detector or the like.

The instrument of this invention provides a versatile transducing device adapted to numerous different purposes. It can be used to measure a force such as pressure from fluid flow which, through deflection of a probe, causes strain gages to give a usable signal. In its basic form the invention includes a tubular element held at one end by a fixed support while the other end may extend into a moving fluid stream. A second tube or rod is received within the first tube, and at its outer end is secured to that element. At a point inwardly from the end, the outer tube is crimped inwardly against the inner rod or tubular member, while the remaining portions are in a spaced relationship. Therefore, when a force is imposed on the probe thus formed, the outer tubular member will bend about the weakened point where it has been crimped inwardly. At the same time, the inner member will pivot about this point which acts as a fulcrum. The deflection of the inner end of the inner rod or tubular member may be used to impose a force on strain gage wires, which thereby will provide a signal indicating the amount of force imposed on the probe.

Accordingly, it is an object of this invention to provide a versatile force transducer adapted for numerous different purposes.

Another object of this invention is to provide a transducer of great sensitivity providing accurate readings, yet of rugged and reliable construction.

A further object of this invention is to provide a force indicating device of simple and low cost construction.

An additional object of this invention is to provide a transducer having a probe that can be inserted into a fluid stream for deflection thereby.

These and other objects will become apparent from the following detailed description taken in connection with the accompanying drawing in which:

FIG. 1 is a longitudinal sectional view of the device of this invention as used as a flow meter, FIG. 2 is a fragmentary side elevational view of the exterior of the probe of FIG. 1 showing the indentation of the sleeve to provide a bendable area and fulcrum, FIG. 3 is a sectional view taken along line 3—3 of FIG. 1 showing the connections of the strain gage wires, FIG. 4 is a schematic diagram of the strain gage electrical circuit, FIG. 5 is a fragmentary side elevational view of a modified probe in which an extension is provided for engagement with the moving fluid stream, FIG. 6 is an end elevational view of the arrangement of FIG. 5, FIG. 7 is a view similar to FIG. 5 of a different form of probe modification, FIG. 8 is a view similar to FIG. 6 of the arrangement of FIG. 7, FIG. 9 is an elongated longitudinal sectional view showing the invention as utilized as an air speed indicator, FIG. 10 is a transverse sectional view taken along line 10—10 of FIG. 9, FIG. 11 is an elevational view, partially in section, showing the device as used as an angle of attack indicator, FIG. 12 is enlarged longitudinal sectional view of the device of the invention as modified for the arrangement of FIG. 11, FIG. 13 is a fragmentary end elevational view of the exterior of the probe of FIG. 12 showing the circumferential groove formed in the sleeve, FIG. 14 is a sectional view taken along line 14—14 of FIG. 12 showing the connections of the two strain gage units, FIG. 15 is a side elevational view, partially in section showing the device of this invention as used for an ice detector, FIG. 16 is an end elevational view of the arrangement of FIG. 15, and FIG. 17 is a schematic diagram of an electrical circuit used in connection with the device of FIGS. 15 and 16.

The basic components of this invention may be seen by reference to FIGS. 1 through 4 where the unit 1 of the invention is associated with a conduit 2 adapted to carry a moving fluid. The device 1 includes a suitable support base 3 which may be secured in the wall of conduit 2 in any suitable manner such as by threads on its circumferential surface mating with threads and an aperture formed in the conduit 2.

A relatively narrow tube 4 is secured to the base 3 at its inner end by suitable means such as soldering or welding, and projects therefrom into the conduit 2 at right angles to the direction of flow through the conduit. Tube 4 is illustrated as enlarged transversely for clarity, but in a typical example need be only around .063 inch in outside diameter and a length of approximately two inches. These dimensions will vary with the particular installation and force measurement encountered.

Within the tube 4 is concentrically received a rod or second tube 5. The outer end of rod or tube 5 may be coterminus with that of tube 4 and the two members are secured at this point by suitable means such as silver soldered joint 6 which seals off the end of the element 4. In addition, at a location spaced well inwardly of the outer end of the two elements 4 and 5, the outer tube is crimped inwardly so that indentations 7 and 8 bear against the periphery of the inner rod or tube 5. The two indentations 7 and 8 are on the leading and trailing edges of the outer tubular element 4 relative to its position in the moving stream of fluid in the conduit 2. In other words, as the unit is mounted, the indentations 7 and 8 are diametrically opposed and located transversely of the axis of conduit 2 and the direction of fluid flow.

From the foregoing it is apparent that as fluid passes through the conduit 2 it impinges on the outer surface of the tube 4, thereby imposing a force on this member. This force will of course tend to bend the probe. As a result of the weak point formed by the notches 7 and 8 where the outer element is crimped inwardly, the bending will take place about this point. With the inner rod or tube 5 being connected to the element 4 at the outer end of these two members, the inner element likewise will deflect upon such movement of the tube 4. The deflection of the inner rod 5 will cause this member to pivot about the inwardly crimped portion of the outer tube, which thereby acts as a fulcrum. Thus the force imposed on the outer tube 4 causes this member to be bent rearwardly about the indentations 7 and 8, while the inner element pivots about the fulcrum of the inwardly crimped portions of the outer tube. This moves the inner end 9 of the rod or tube 5 forwardly. In this manner the tube 4 acts as a deflectable beam, while the rod 5 moves essentially as a bellcrank.

Preferably, the lower end 10 of rod 5 is of relatively large diameter, as shown, and may be complementary to the the interior of tube 4. This gives the rod added stiffness at the area where external forces are applied. The end joint 6 provides a seal so that no fluid flow inwardly through tube 4 can take place. Depending tubular section 3a of the base surrounds a substantial portion of tube 4, acting as a stop to limit movement of the probe due to excessive dynamic pressure from high velocity flow or surges. This protects the probe from damage.

The forward deflection of the inner rod 5 is utilized in connection with strain gages to provide a usable signal indicating the amount of deflection of the two members of the probe. This deflection, of course, is a measurement of the force imposed on the probe, and when converted into an electrical signal can be read directly to show the flow rate within the conduit 2. As best seen in FIGS. 2 and 3, the base element 3 carries upstanding dielectric posts 11 and 12 which are disposed forwardly and rearwardly of the probe. These posts are positioned so that a line interconnecting them would be aligned with the axis of conduit 2 and hence the direction of fluid flow.

In addition, terminal studs 13 and 14 are mounted on base 3, being disposed on either side of post 11. A similar pair of terminal posts 16 and 17 is located adjacent post 12. A strain gage wire 18 extends from element 13, around post 11, then is looped around end 9 of rod 5 and extends back around post 11 to contact end 14. Likewise, strain gage wire 19 is extended from terminal 16 to loop around end 9 and post 12, at its opposite end being connected to terminal 17. The wires 18 and 19 do not contact each other at end 9 of rod 5, and are insulated with respect to the rod.

There is no electrical connection between wires 18 and 19 and the deflectable rod 9. These parts may be insulated by the provision of a small extension 20 of dielectric material held to rod end 9 by a sleeve 21. The strain gage wires 18 and 19 are looped around the extension 20 and so do not make contact with the rod.

It is apparent, therefore, that as the inner end 9 of the rod 5 deflects, more or less tension can be imposed upon the strain gage wires 18 and 19, depending upon the direction and amount of movement of end 9. This will alter the resistances of the wires 18 and 19 to the flow of electric current therethrough.

The strain gage circuit may be generally conventional, utilizing a Wheatstone bridge which is given an unbalanced condition by a change in resistance in the two strain gage wires for causing a flow through a suitable meter. Thus, as seen in FIG. 4 the bridge circuit includes the resistances 18 and 19, as well as fixed resistors 23 and 24. Leads 25 and 26 supply electrical energy to the bridge, which in one embodiment is 1.5 volts D.C. A galvanometer 27 within the bridge measures the current flow resulting from varying the resistance of the resistors 18 and 19. The galvanometer 27 may give readings of from zero to one hundred microamperes, or may be calibrated to indicate directly the amount of force causing the deflection of the probe. Optionally, the dial may be appropriately marked so that a direct velocity reading is obtained, or the current may be utilized to actuate various recording or other indicating devices.

Actually, very little movement of the probe is necessary in enabling the strain gage circuit to produce a highly accurate reading. In a typical example, the inner end 9 or rod 5 has a maximum deflection of only 0.0015 inch. The outer tube 4 limits the amount of travel of rod 5, thereby precluding damage from overstressing.

Under certain flow conditions it is preferred to extend the inner element of the probe assembly to a point beyond the end of the outer tube 4. Such a construction may be seen in FIGS. 5 and 6 where rod 30 projects beyond the end of the tube 4 and carries a baffle or paddle-like element 31. A soldered joint is provided at the end of tube 4 as in the previously described embodiment. The paddle 31, which may be circular in elevation, or square, or of other shape, provides a greater resistance to the flow of a fluid and hence will enable the unit to obtain a reading when flow velocity is low, or under other conditions where greater sensitivity is required. The operation of the device, however, is identical to that described above with the two concentric elements of the probe deflecting as a result of relative fluid flow, and the inner element pivoting about the crimped portion in the outer tube.

Other forms of paddle elements are possible, depending upon the viscosity of the fluid and other flow conditions. The shape of the paddle will be tailored to suit the conditions at hand. It may be, for example, in the form of the cylindrical element 33 as seen in FIGS. 7 and 8, which is located so that its axis is transverse to the direction of flow.

The device of this invention has many uses other than as a direct flow meter as described above. For example, it may be used as an air speed indicator when incorporated in the unit seen in FIGS. 9 and 10. Here there is included a boom 35 adapted to be attached to an aircraft, missile or other movable device so that the axis of the boom is substantially aligned with the direction of the flow of air. The boom includes a hollow chamber 36 having a forward opening 37 leading into an ogival entrance section 38. Electrical resistance elements 39 may be embedded within the boom for maintaining this forward portion free of ice.

At the aft end of chamber 36 are three openings 40, 41 and 42 permitting egress of air which has entered through inlet 37. Substantially adjacent these outlet openings is a flat plate element 44 which is inclined forwardly at the top, as illustrated, so that it has an angle such as 30° with respect to the axis of the chamber 36. This paddle attaches to the inner rod 45 of a probe similar to that described above in which an outer tube 46 likewise is included. A suitable housing 47 supports the probe and the strain gage circuitry. This unit is basically the same as the other embodiments of the invention, with the inner element 45 being attached to the outer tubular member at the outer end of the latter element, and the probe being deflectable in response to the air flow coming in through the chamber 36.

The air impinging upon the inclined plate formed by element 44 will deflect this member upwardly. The amount of this deflection depends upon the rate of flow through chamber 36. Hence, this deflection provides an indication of the velocity through the chamber 36 and gives a measure of air speed of the vehicle carrying the boom 35. Thus by simple modification in which an inclined plate is held by the inner element of the transducer of this invention, and in which the transducer is housed within a suitable pitot static boom, an accurate and sensitive indication of relative air speed can be obtained.

Another use for the device of this invention may be seen in FIGS. 11, 12, 13 and 14 where the unit is arranged to give an indication of angle of attack. Here the sleeve member 51 projects beyond the nose 49 of the missile or other vehicle with which it is associated, and carries a conical member 50 which is thus placed in the airstream immediately ahead of the nose 49. The inner element 48 of the probe assembly extends into an outer sleeve 51 as in the previously described embodiment. In this version of the invention, however, the indented portion 52 of the outer tubular member 51 is crimped inwardly around its entire periphery, as shown in FIG. 13, rather than only in two directions as before. This means that the inner rod member 48 may be deflected in any direction. The end 53 of rod 48 opposite the baffle 50 carries strain gage wires 54, 55, 56 and 57 (see FIG. 14) rather than merely two strain gage wires as before. There are four dielectric posts 58, 59, 60 and 61, around which the strain gage wires are looped, and a duality of terminal studs for each one. The latter elements 62, 63, 64, 65, 66, 67, 68 and 69 provide a means for connecting to the strain gage wires into the associated circuitry.

This version of the invention utilizes in effect two independent strain gage circuits, each of which actuates its own galvanometer. Thus, the diametrically opposed strain gages 54 and 55 are located in one circuit, while the other diametrically opposed pair of strain gage wires 56 and 57 is separately connected into the other circuit. Each of these circuits may be identical to that illustrated in FIG. 4.

It is apparent, therefore, that with the conical shaped element 50 in the stream of air, a deflection may be obtained in any driection. This deflection will be permitted by the 360° necked-down portion 52 of the outer tube 51, allowing the inner tube to pivot in any direction. Of course, such pivotal movement normally will not be merely in the direction of any two opposed strain gage resistance wires. As a result, both galvanometers will be caused to read from the deflection of the element 48 resulting from the airstream impinging on baffle 50. The unit may be positioned so that the opposed set of resistances 56 and 57 will give an indication of the vertical movement of the element 51, while the resistances 54 and 55 provide a reading of the horizontal deflection thereof. By observing the reading of the two galvanometers, therefore, it is possible to determine both horizontal and vertical angles of attack.

When constructed as illustrated in FIGS. 15, 16 and 17, the device of this invention is useful as an ice detector. Such a unit may be provided in the inlet duct of a jet engine, for example, and utilized to actuate equipment which will provide heated air within the inlet duct to preclude icing conditions that might be damaging to the engine. As illustrated, the device includes an outer sleeve 70 which extends into the engine inlet duct or other location where icing may occur. This sleeve may have resistance elements 71 embedded therein so that it can be heated for ice removal. A probe 72, basically similar to the other probes discussed above, extends through the sleeve 70. The inner rod 73 has a thin outer end 74 which is in the form of a knife edge projecting into the airstream beyond the outer tube 75. The thin end 74 is positioned in alignment with the airstream. Under normal conditions of flow in the duct, therefore, the knife edge end 74 will offer practically no resistance to the airflow, and thus will be essentially undeflected from fluid forces in the duct. However, in the event of icing conditions, ice 76 will build up on the end 74 of the inner rod element, causing it to present a larger profile to the airstream. As a result, the resistance to fluid flow is increased and the probe 72 will be caused to deflect. This deflection can be used in generating a signal to show that icing has occurred, and also can be used to actuate the deicing equipment.

One arrangement for operating the deicing equipment may be seen in FIG. 17 where the bridge circuit 78 includes instead of a galvanometer at the center, the coil 79 of a relay 80. The relay is of the normally open double pole type so that when current passes through the coil due to an unbalance of the bridge circuit, both contacts close, allowing current to flow through the conductors 81 and 82. The former extends to the resistance heaters 71 in the outer sleeve 70. This lead also is connected to an additional resistance element 83 which extends through the rod 73 of probe 72 at its axis. The two resistance heaters, therefore, cause both the sleeve 70 and the probe 72 to be cleared of ice. This includes the ice deposits 76 on the outwardly projecting knife edge.

The current in conductor 82 lights the signal light 84, indicating to the pilot that the icing condition has been encountered. The line 82 also may be connected to the deicing equipment, causing automatic operation thereof upon the closing of relay 80. Various deicing arrangements may be utilized such as the type that will furnish heated air in the inlet duct to preclude ice from entering the engine.

It can be seen by the foregoing that the device of this invention has a great deal of versatility and may be used under many different circumstances. It works on the simple principle of two deflectable elements so arranged that the inner part pivots about a bendable point in the outer element, and as a result will cause movement of strain gage resistance wires. Only a minute amount of deflection is required in order to obtain extremely accurate readings of the force encountered. The probe is rugged and adapted for use in lines carrying corrosive or dangerous fluids. While various examples have been given of the ways in which this invention may be utilized, it is apparent that the same basic principles may be employed in other systems in which movement can be translated into a usable signal.

The foregoing detailed description is to be clearly understood as given by way of illustration and example only, the spirit and scope of this invention being limited solely by the appended claim.

I claim:

A transducer comprising
a first elongated tubular member,
a second elongated member connected to said first member at one end portion of said first member,
    for causing said second member to move with said first member at the location of said connection upon deflection of said one end portion of said first member,
said first member having a relatively bendable area intermediate the ends thereof,
    for causing said first member to deflect at said area upon imposition on said first member of a bending force,
said first member having fulcrum means engaging said second member at said relatively bendable portion,
    for causing said second member to pivot about said fulcrum means upon such deflection of said first member,
    the remaining area of said first member being in spaced relationship with said second member,
strain gage means connected to said second member at a location spaced from said fulcrum means and on the side thereof remote from the location where said second member is connected to said first member,
    said second member having a portion projecting outwardly beyond said one end of said first member,
    said portion of said second member projecting beyond said tubular member being formed as a substantially thin flat element adapted to present a knife edge in a relatively moving fluid stream,
said strain gage means including
    Wheatstone bridge circuit means having a duality of opposed strain gage resistance wires connected to said location on said second member for movement therewith, and relay coil means at the center of said Wheatstone bridge means,
normally open contact means closable by current through said relay coil means,
a second circuit means including said contact means and indicator means for indicating the closing of said contact means,
a tubular member surrounding said elongated members beyond which said substantially thin flat portion of said second member projects,
heater means for said tubular member,
and heater means for said elongated members,
said heater means being in said second circuit means and operable upon closing of said contact means by said relay coil means.

References Cited by the Examiner
UNITED STATES PATENTS

| | | | |
|---|---|---|---|
| 2,024,571 | 12/1935 | Gent | 73—228 |
| 2,462,577 | 2/1949 | Warren | 73—189 |
| 2,477,233 | 7/1949 | Bristol | 73—410 |
| 2,778,905 | 1/1957 | Statham | 73—228 X |
| 2,826,914 | 3/1958 | Reiley | 73—228 |
| 2,844,034 | 7/1958 | Statham | 73—398 |
| 2,855,779 | 10/1958 | Zaid | 73—88.5 X |
| 3,147,620 | 9/1964 | Stapler | 73—228 |

FOREIGN PATENTS 804,211   11/1958   Great Britain.

RICHARD C. QUEISSER, *Primary Examiner.*
ROBERT L. EVANS, *Examiner.*